United States Patent [19]

Antonov et al.

[11] Patent Number: 4,503,498
[45] Date of Patent: Mar. 5, 1985

[54] MULTIPROCESSOR CRATECONTROLLER

[75] Inventors: Lyubomir Y. Antonov; Alexander M. Trenev; Angel M. Angelov; Kostadin D. Yanev, all of Sofia, Bulgaria

[73] Assignee: Baza Za Avtomatizacia Na Nauchniawxperiment, Sofia, Bulgaria

[21] Appl. No.: 389,926

[22] Filed: Jun. 18, 1982

Related U.S. Application Data

[63] Continuation-in-part of Ser. No. 111,310, Jan. 11, 1980.

[30] Foreign Application Priority Data

Jan. 11, 1979 [BG] Bulgaria .................................. 42038

[51] Int. Cl.³ .............................................. G06F 13/00
[52] U.S. Cl. .................................................... 364/200
[58] Field of Search ... 364/200 MS File, 900 MS File

[56] References Cited

U.S. PATENT DOCUMENTS 4,377,000  3/1983  Staab .............................. 364/184 X Primary Examiner—Raulfe B. Zache

[57] ABSTRACT

Multiprocessor cratecontroller, containing control microprocessor with storage, each of them bi-directionally connected with the bus of the microprocessor. A data channel control processor is connected with a program storage, a multiplexer, an address register of the program storage, an interruptions handling processor, a data address register, a data register and the bus of the microprocessor. The program storage is connected with the bus of the microprocessor, with the register of stations, with the multiplexer, and with the data address register; the multiplexer is connected with the bus of the microprocessor and the address register of the program storage, which is connected also with the bus of the microprocessor. The register of stations is connected with a CAMAC bus as well as the interruptions handling processor. The data address register and the data register are connected with the bus of the microprocessor and the CAMAC bus as well.

1 Claim, 3 Drawing Figures

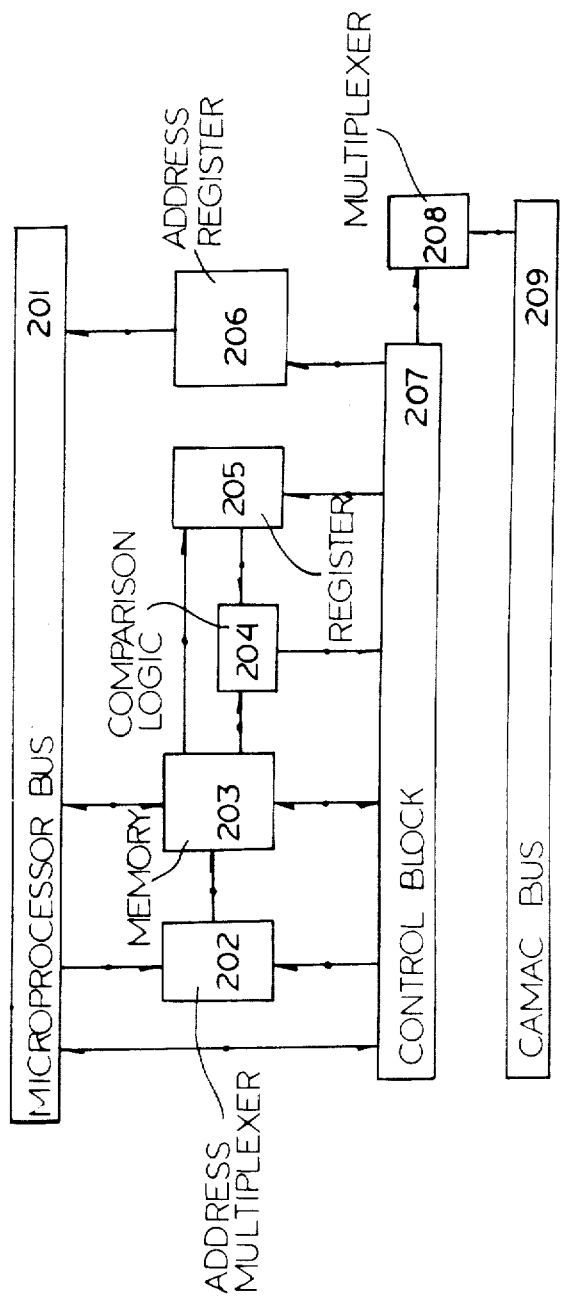

MULTIPROCESSOR CRATECONTROLLER

This applicatioN is a continuation-in-part of application Ser. No. 111,310, filed Jan. 11, 1980.

BACKGROUND OF THE INVENTION

This invention relates to a multiprocessor cratecontroller which could be used in the automation of systems and the making of scientific instruments.

A microprocessor cratecontroller, which contains a microprocessor, a program, and internal storage connected through interface circuits, containing a CAMAC strobe generator, a CAMAC instruction register and a block for CAMAC zero address instruction control—with the CAMAC bus, is known. Data transfer between the CAMAC bus and the storage of the cratecontroller is realized by means of a 3K 8-bits storage, as 1K 24-bits word storage. The microprocessor uses 8-bits per cycle from this storage array, the CAMAC bus directly exchanging 24-bits words per cycle.

This type of solution is convenient for a high-data rate in the transfer between modules and the microprocessor, but raises difficulties in real-time processing, because of the high-level time consumption for the transfer of the content of the one variable. It is an inefficient mode for the storage, because 24-bits words are not always used in the data transfer.

The use of 3 by 8 logical gates is the other known and often used way of realization of data transfer on the bus. This mode is slower, but more to be preferred for input-output operations because of a high-data rate in real-time processing.

The defects of the known microprocessor cratecontrollers are the low speed of the storage cycle, the fixed priority levels of the stations of the crate, software interruption handling, which still raises the time of the storage cycle; finally, the specific modes and datablocks transfer is software realized.

SUMMARY OF THE INVENTION

The object of this invention is to provide a multiprocessor cratecontroller in the CAMAC system, in which for the creation of high-speed operation, the different processors are provided with specialized functions.

This problem is resolved by the multiprocessor cratecontroller of the invention, containing a control microprocessor with storage. Each of the components has separate bi-directional connection with the bus of the microprocessor. A data channel control processor is connected to a program storage, a multiplexer, addresses of an address register of the program storage, a register of stations, an interruptions-handling processor, a data address register, and a data and microprocessor's bus register. The program storage is connected with the bus of the microprocessor, register of stations, multiplexer and with data address register, a bit multiplexer is connected with the bus of the microprocessor and program storage address register. The program storage address register is connected with the bus of the microprocessor and the register of stations is connected with the CAMAC bus also, a bit interruptions handling processor, data address register and data register being connected with the bus of the microprocessor and the CAMAC bus as well.

The advantages of the multiprocessor cratecontroller of the invention are, the high-data rate of transfer between the CAMAC modules and the multiprocessor cratecontroller, by some extra means, there could be realized the specific functions of a spectrum analizer, the requests priority for the interruptions from modules are programmable and can be dynamically changed as well as the programs for handling of interruptions.

DESCRIPTION OF THE DRAWING

An embodiment of the invention will now further be described with reference to the accompanying drawings, in which:

FIG. 3 shows a block diagram of an interruptions handling process also to be used in said invention.

DESCRIPTION OF THE PREFERRED EMBODIMENT

Figure 1:
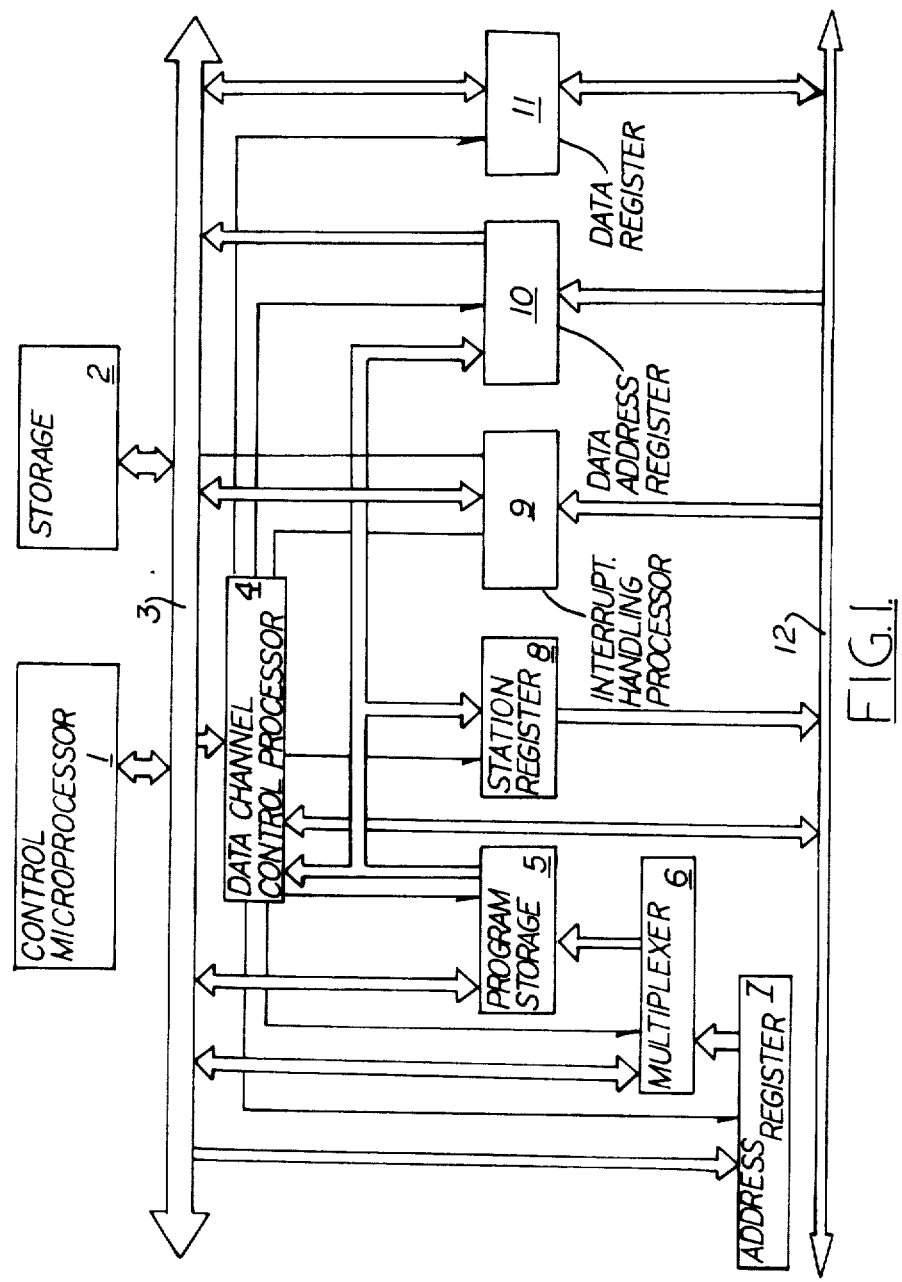
FIG. 1 shows a block diagram of the multiprocessor cratecontroller.

According to the invention, the multiprocessor cratecontroller of the invention has control microprocessor 1 with a storage 2, each being connected separately and bi-directionally with the bus 3 of the microprocessor 1. A data channel control processor 4 is connected with a program storage 5, a multiplexer 6, an address register 7, a page register 8, an interruptions handling processor 9, a data address register 10, a data register 11, the bus 3 of the microprocessor and a CAMAC bus 12. The program storage 5 is connected with the bus 3 of the microprocessor, a register of stations 8, multiplexer 6 and a data address register 10; multiplexer 6 is connected with the bus 3 of the microprocessor 1 and the address register 7 of the program storage 5, which address register 7 of the program storage 5 is connected with the bus 3 of the microprocessor; page register 8 is also connected with the CAMAC bus 12; the interruptions handing processor 9, the data address register 10 and the data register 11 are connected with the bus 3 of the microprocessor 1 and the CAMAC bus 12 as well.

Control microprocessor 1 and storage 2 are complete microcomputer configurations with large programming and computing capacities. The control microprocessor 1 is constructed on the basis of the universal 8-bit microprocessor system M6800 manufactured by Motorola, Inc. The structural circuit thereof includes a programmable timer M6840 and an arithmetical processor AM9511. Through the operation system stored in the permanent memory of the control microprocessor, the tasks of the whole CAMAC-system is managed by means of the data channel control processor 4 and the interruptions handling processor 9. The operating program of the data channel control processor 4 is recorded in the program memory thereof which occupies part of the address register of the control microprocessor 1. The requests for handling from CAMAC modules by means of the interruptions handling processor 9 are queued up by the control microprocessor 1 after serving a signal for interruption (IRQ) accompanied by the address vector of the corresponding handling program. In addition, the control microprocessor 1 starts separate CAMAC programs stored in the program memory of the data channel control processor.

Figure 2:
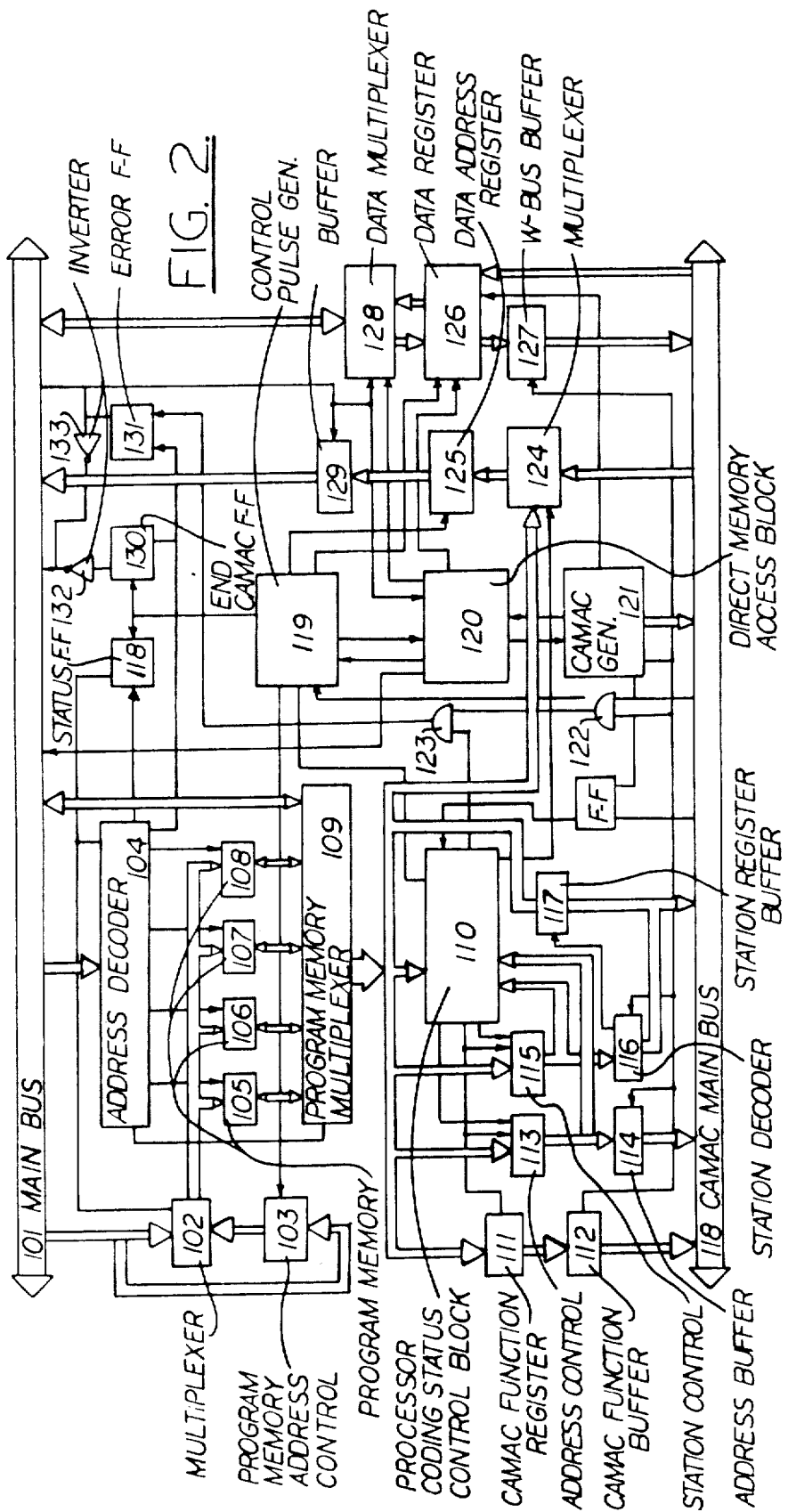
FIG. 2 shows a block diagram of a data channel control processor to be used in said invention.

A data channel control processor for use in the microprocessor cratecontroller of the present invention is shown in FIG. 2 and consists of a program memory address multiplexer 102 whose inputs are connected to the microprocessor main bus 101 and the outputs of the program memory address counter 103, and the mutliplexer 102 outputs are connected to the address inputs of program memories 105, 106, 107 and 108; the control input of the multiplexer 102 is connected to the single output of a status flip-flop 118, whose S-input is connected to the address decoder 104, and whose R-input is connected to the control pulse generator 119 and the S-input of an End CAMAC flip-flop 130. The R-input of the flip-flop 130 is connected to the address decoder 104 and the S-input of an error flip-flop 131, and the output of flip-flop 130 is connected to an open collector inverter 132 whose output, in turn, is connected to the IRQ bus of the microprocessor main bus 101 and the output of an open-collector inverter 133, the input of which being connected to the output of the error flip-flop 131. The R-input of flip-flop 131 is connected to the output of a double input AND-gate 123, whose one input is connected to the processor status coding and control block 110, and its second input to the output of a double input AND-NO gate 122, whose first input is connected to the X-bus of the CAMAC-main bus 118, and the second input to B-output of a CAMAC generator 121. The CAMAC generator 121 is connected to the resolving inputs of a CAMAC-function buffer 112, the CAMAC-address buffer 114, the station decoder 116 and the W-bus buffer 127 via the CAMAC-main bus 118. The chip-selects of program memories 105, 106, 107 and 108 are connected to the address decoder 104, and the D-busses of program memories 105, 106, 107 and 108 are bilaterally connected to a program memory multiplexer 109, which is bilaterally connected to the microprocessor main bus 101 and unilaterally to a CAMAC-function register 111, a CAMAC-address counter 113, a station counter 115, the processor status coding and control block 110, a station register buffer 117 and a multiplexer 124 of a data address register 125. The control input of the program memory multiplexer 109 is connected with the address decoder 104; and the address decoder 104 to the address busses of the microprocessor main bus 101. The counter input of the program memory address counter 103 is connected to the control pulse generator 119, which is connected to the CAMAC-generator 121 bilaterally, to the processor status coding and control block 110, the counter input of the data address register 125, the loading input for data register 126, and in addition is bilaterally connected to the direct memory access block 120. The direct memory access block 120 is connected to the VMA bus of the microprocessor main bus 101 and C1 bus of the microprocessor main bus 101, which is connected to the resolving input of the data address register buffer 129 and the control input data multiplexer 128 and, in its turn, the control input for controlling the direction of the multiplexer 128 is connected to the direct memory access block 120. The data multiplexer 128 is bilaterally connected to the D-busses of the microprocessor main bus 101 and the inputs of the data register 126, which, in turn, is connected to the W-bus buffer 127, with the R-busses of the CAMAC main bus 118, the CAMAC-generator 121 and the direct memory access block 120, which, in turn, is bilaterally connected to the CAMAC-generator 121. The CAMAC-generator 121 is connected to the clock input of flip-flop 134, whose D-input is connected to Q-bus of the CAMAC-main bus 118, and whose single output is connected to the processor status coding and control block 110, which, in turn, is further connected to the multiplexer 124 of the data address register 125, the station counter 115, the CAMAC-address counter 113 and the CAMAC-function register 111, whose outputs are connected to buffer 112, the outputs of which are connected to the F-busses of the CAMAC-main bus 118. The inputs of the address counter 113 are connected to buffers 114 whose outputs are connected to the A-bus of the CAMAC main bus 118. The outputs of the station counter 115 are connected to the inputs of the decoder 116, whose outputs are connected to the outputs of the station register buffer 117 and the N-busses of the CAMAC main bus 118.

Depending on the program recorded in the program memories 105–108, the data channel control processor goes into one of three basic operating modes each of which is characterized by the control of one of the three main processor blocks: control pulse block 119 (generator 119); the direct memory access block 120; and CAMAC-generator 121. The transitions from one state of operation to another are effected by the control of the processor status coding and control block 110. The control pulse generator 119 prepares the data channel control processor for operation. The start-up of the processor is effected by the address decoder 104 which decodes the start address. The status flip-flop 118 inhibits the selection of program memories 105–108 by the microprocessor main bus 101 and enables the supply of the content of the program memory counter 103 across the program memory address multiplexer 2, and the address decoder 104 supplies a common select simultaneously to the four program memories 105–108. Thus by means of the data multiplexer 109, the content of the selected cells (having the same address) of the program memories 105–108 is fed to the CAMAC-function register 111, the CAMAC-address counter 113, the station counter 115, the processor status coding and control block 110, and, by means of the data address register multiplexer 124, to the data address register 125.

The CAMAC-channel control process operates by two command formats depending on the bit state in the command—single format (32 bits) and double format (64 bits).

After the CAMAC-channel control process is energized by means of the control pulse generator 119 and the processor status coding and control block 110, the initialization of the processor occurs which is expressed in loading the read-out content of program memories 105–108 in the function register 111, in the CAMAC-address counter 113, the station counter 115 and, depending on the type of CAMAC-commands, in the data address register 125. After the initial preparation, the data channel control processor is shifted to one of the two states characterized by the control of the direct memory access block 120 and CAMAC-generator 121.

Referring back to FIG. 1, the data channel control processor 4 also has access to the storage 2. Both processors 1, 4 are connected with storage 2 in a time-sharing mode. Program storage 5 is accessable from microprocessor 1, in other words, in that case it is a part of its own storage, and from data channel control processor 4. The control processor 1 can read/write from/to program storage 5, but the data channel control processor 4 can only read therefrom. Through the multiplexer 6, the program storage 5 is addressable and can be selected by one of the two processors 1, 4. The register of stations 8 determines the module to which the data channel control processor 4 applies.

All the interruption requests from the modules received into the crate through the CAMAC bus 12 are handled asynchronously by the interruptions handling processor 9, which transmits an interruption signal to the control microprocessor 1 and the start address of the interruption handling program. Data address register 10 addresses the storage location, where the content of the data register 11 is to be recorded, or from which data is to be read, in the data register 11. Data register 11 receives/transmits the information from/to different modules of the crate through the CAMAC bus 12.

Referring to FIG. 3, a device for processing interrupts consists of a control block 207, connected to an address multiplexer 202, memory 203 for storing the priorities, address register 206, multiplexer 208 for the requests for interrupts, register 205 for the current priority, comparison logic 204 and a microprocessor bus 201. The address multiplexer 202 is connected to the microprocessor bus 102 and the memory 203 for storing the priorities 3, which is also connected to the microprocessor bus 201, the comparision logic 204 and the priorities register 205. The register 205 is connected also to the comparison logic 204, the address register 206 is connected to the microprocessor bus 201, also. The multiplexer 208 for the requests for interrupts is also connected the "CAMAC" bus 209.

The device for processing interrupts functions as follows:

When the system is initialized, the control block 207 issues a signal for resetting the registers 205 and 206. Along the microprocessor bus 201, the central processing unit sends the address sequence of all cells in the memory 203. Simultaneously, on the microprocessor bus 201 a signal is sent for storing in the memory 203 in binary form, the priority corresponding to the given address. The cut-off priority is stored in the zero address of the memory 203. After the memory 203 is loaded, a signal for starting normal operation of the device for processing interrupts is sent to the control block 207. The control block 207, feeds, through the address multiplexer 202 to the memory 203, the zero address. The number P, called the cut-off priority level, contained in that address, is written in the priority register 205. At every pulse by the pulse generator, which is in the control block 207, the address fed by the control block 207 to the memory 203 is increased by one. In case, when the control block 207 is feeding an address corresponding to the source of interrupt requests, which has not issued such a request to the multiplexer 208, from the memory 203 the number zero is fed to the comparison logic 204. Since $0 < P$ and $0 < X$, where X is the number contained in the priority register 205, the content of the priority register 205 and the address register 206 remain unchanged. When the control block 207 feeds an address, which corresponds to a source that had issued an interrupt request to the request multiplexer 208, from the memory 203 the number contained in that address is fed to the comparison logic 204. If $Y < X$ the contents of the registers 205 and 206 remain unchanged. When $Y > X$, then the control block 207 generates signals and as a result Y is stored in the register 205, and the current address is stored in the address register 206. Simultaneously, the control block 207 issues along the microprocessor bus 201 an interrupt request, after that it feeds the next address and the device continues its operation. Thus, during every moment of the device operation, in the priority register 205 the value of priority is kept, while in the address register 206 the address of the source of interrupt requests with the highest priority among the sources which have issued requests is kept. When the multiplexer 208 accepts the interrupt request, issued by the control block 207, it reads from the addess register 206 the address of the request source with the highest priority.

The control program of the data channel control processor 4 and the program storage 5 is loaded by the control microprocessor 1 and its operating system. Interruptions handling processor 9 receives requests from the modules through the CAMAC bus 12. Its storage is preliminarily loaded with all priorities of requests by the control microprocessor 1. Interruptions handling processor 9 selects from all requests the one with the highest priority and transmits the interruption signal to the control microprocessor 1. If in that time the data channel control processor 4 is busy because of program execution, the control microprocessor 1 handles the interruption request and waits for the signal of the end of program execution from the data channel control processor 4, and afterward transmits a start signal to the data channel control processor 4 for handling the next interruption request, and at the same time transmits the start address of the interruption handling routine. The data channel control processor 4 starts in a natural order the program execution from the program storage 5. The format of instructions is CAMAC system oriented, e.g. it contains the information for the CAMAC type of operation (EUR 4600 standard), and the number of an actual module form the cratecontroller.

The processing mode (STOP MODE, ADDRESS SCAN, REPEAT MODE, BLOCK TRANSFER MODE) contains the first memory location, where from/to will be read/written the information, data block length, and the end conditions for some modes. Each instruction is executed in the next way which is programmed. After the instruction is received in the program storage 5, data channel control processor 4 stores the CAMAC function F under the address of a register or block of a module and tranfers to the register 8 the number of that module N. If the instruction is "read" or "write", it sends the storage location address to the data address register 10. According to the type of instruction (if "read") at first, the data channel control processor 4 generates a sequence of "read" instructions from the program storage 2, locations being addressed by data address register 10, and "write" instructions into data register 11, an address increment, "read" and "write", the new byte goes into the storage, and the next increment is again "read" and "write". This is so because of the one byte length of the word of the microprocessor, when the word of the length of the CAMAC word length is 24 bits. After this preliminary process, the data channel control processor 4 generates a CAMAC instruction, e.g. the number of a module which is the source of the request, the binary coded function and address of the module's block. If the instruction is executed in some manner, this sequence is repeated as many times as it is necessary to fulfill the programmed conditions. In the same period of time, the interruptions handling processor 9 handles the requests and transmits the corresponding information to the control processor 1.

Although the invention is illustrated and described with reference to a plurality of preferred embodiments thereof, it is to be expressly understood that it is in no way limited to the disclosure of such preferred embodiments, but is capable of numerous modifications within the scope for the appended claims.

We claim:

1. In a multiprocessor cratecontroller containing a control microprocessor with storage, each of them being bidirectionally connected with the bus of the microprocessor, the improvement comprising a data channel control processor connected with a program storage, a multiplexer, an address register of the program storage, a register of stations, an interruptions handling processor, a data address register, a data register and the bus of the microprocessor wherein said program storage is connected with the bus of the microprocessor, the register of stations, the multiplexer, and the data address register, said multiplexer being connected with the bus of the microprocessor and the address register of the program storage, which is connected also with the bus of the microprocessor; the register of stations being also connected with a CAMAC bus; said interruptions handling processor, the data address register and the data register being connected with the bus of the microprocessor and the bus of the CAMAC.

* * * * *